May 30, 1961   J. N. ELLIS ET AL   2,986,663
ROTOR CONSTRUCTION FOR DYNAMOELECTRIC MACHINES
Filed Oct. 16, 1958   2 Sheets-Sheet 1

INVENTORS.
JAMES N. ELLIS
JAMES N. HIBBARD
BY Bosworth, Sessions, Herndon & Knowles
ATTORNEYS INVENTORS,
JAMES N. ELLIS
JAMES N. HIBBARD
BY Bosworth, Sessions,
Herrstrom & Knowles
ATTORNEYS

United States Patent Office 2,986,663
Patented May 30, 1961

2,986,663

ROTOR CONSTRUCTION FOR DYNAMO-ELECTRIC MACHINES

James N. Ellis, Canoga Park, Calif., and James N. Hibbard, Euclid, Ohio, assignors, by mesne assignments, to The Siegler Corporation, Los Angeles, Calif., a corporation of Delaware Filed Oct. 16, 1958, Ser. No. 767,726

9 Claims. (Cl. 310—60)

This invention relates to the construction of dynamoelectric machines and particularly to the construction of rotors for dynamoelectric machines.

One of the problems encountered in the operation of dynamoelectric machines is that of dissipating the heat produced by current flowing through the various windings, and particularly, the dissipation of heat from within the interior of coils formed by a plurality of windings. This invention relates to the construction of rotors for dynamoelectric machines adapted to dissipate the heat from within coils that are carried by the rotor. For purposes of illustration only, this invention is described in terms of its application to the construction of a rotor for a synchronous dynamoelectric machine. Its application, however, is not limited to synchronous machines, but comprehends the construction of a coil-carrying rotor for any dynamoelectric machine.

Synchronous machines, as is well known, are of two general types. One type employs a stationary field and a rotating armature and the other type employs a revolving field and a stationary armature. This invention may be adapted to the latter type, for example, in which the rotor carries direct current coils wound about poles for the establishment of a revolving unidirectional magnetic field. Such rotors are generally multipolar in configuration comprising diametrically opposed north and south pole pairs. The radially extending poles are energized by direct current windings supplied by a suitable external source of D.C. power. In a four pole machine comprised of two diametrically opposed north and south pole pairs, for example, four coils or windings are utilized, one about each pole.

Rotors for revolving field synchronous machines generally comprise a shaft carrying a laminated core structure having radially projecting poles about which the energizing coils are wound. The poles extend to the outer periphery of the rotor. The energizing windings are formed in coils that encircle the poles and lie within the inner periphery of the rotor, occupying the spaces between the radially projecting poles; i.e., each coil comprises a portion that passes along one axial side of its associated pole, an end turn portion that extends axially beyond the end of the core structure, a portion that returns along the other axial side of the pole and another end turn portion completing the coil.

One of the problems encountered in the operation of revolving field synchronous machines is that of dissipating the heat from the "hot spot" produced within the coils by the current flowing through the rotor windings. In the past, the heat has been carried off by oil or other fluid flowing in tubes which pass through or between the coils. This method of dissipating the heat from within coils produces other problems of construction and operation such as the complexity of building the fluid-carrying tube into the rotor windings and the risk of possible leakage of the fluid from the tube. Another presently used construction employed to cool the coils involves using only the poles to carry the heat from the coils to a fluid cooled shaft. This latter type of construction is relatively simple and avoids the problem of leakage of the cooling fluid but is not as effective in dissipating the heat from the rotor windings.

It is, therefore, the principal object of our invention to provide a simple and effective means for dissipating heat from the coils of a rotor of a dynamoelectric machine. Another object of our invention is to provide such means that are of simple construction. A further specific object of our invention is to provide such means that eliminate the risk of possible leakage of a fluid cooling medium within the coils. It is still another specific object of our invention to provide such means that increase the effectiveness of the fluid cooling medium carried in rotors having hollow shafts.

Briefly, the foregoing objects of our invention are accomplished by a rotor construction having longitudinally extending ribs of high thermal conductivity projecting radially from the central portion of the core structure into or between the windings of the rotor. The ribs efficiently carry heat from within the coils to the central portion of the rotor core structure surrounding a hollow rotor shaft which is preferably cooled by oil or other fluid passing through it.

Referring now to the drawings which illustrate the preferred embodiment of our invention:

Figure 1:
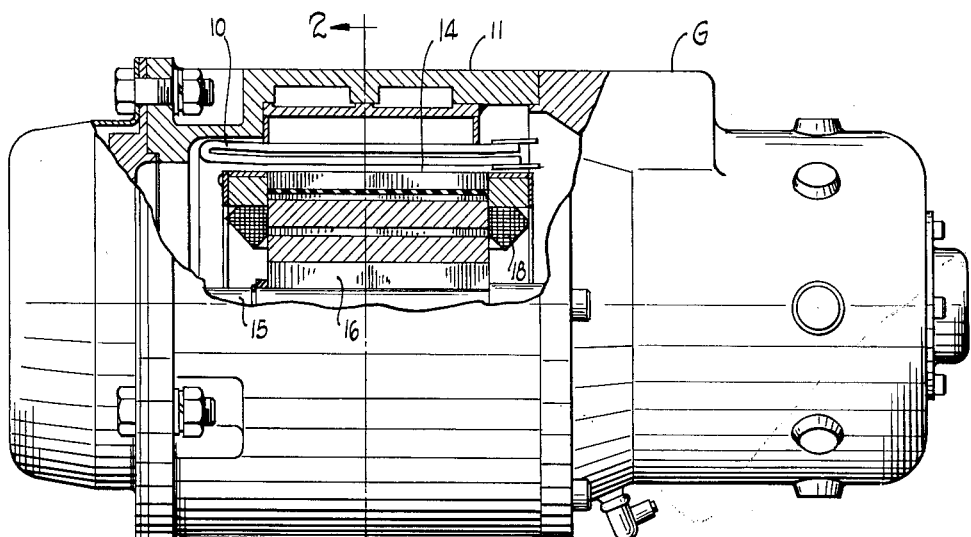
Figure 1 shows a generator employing a preferred form of the rotor of our invention, the outer case of the generator being partially broken away and the stator and rotor of the generator being partially sectioned along the plane of one of the cooling ribs of the rotor.

Referring now to the drawings, the generator G, shown in Figure 1, is a conventional revolving field synchronous machine having stationary armature windings 10 mounted within the case 11. Rotor 14 is mounted for rotation on a shaft 15 mounted concentrically with the annular armature 10. The rotor 14 is made up essentially of a rotor core structure 16 carrying rotor windings 18.

Figure 2:
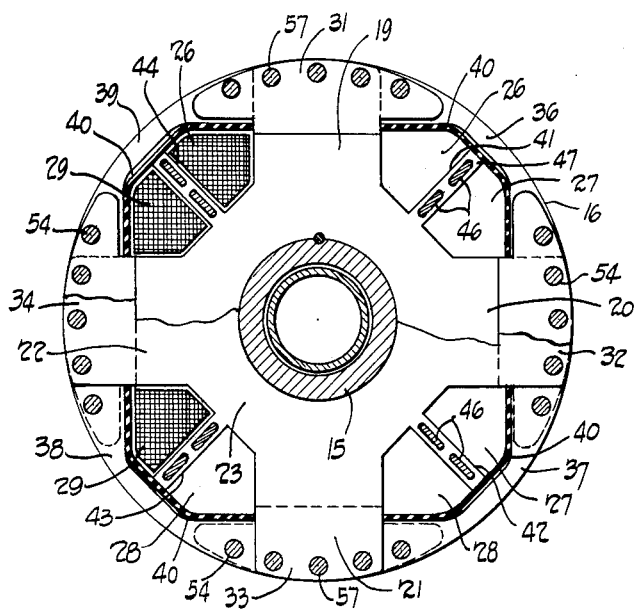
Figure 2 shows, in transverse cross section taken along line 2—2 of Figure 1, a preferred form of rotor of the present invention.

Our invention is best seen in transverse cross section as in Figure 2. The rotor core structure 16, suitably mounted on shaft 15, is formed with poles 19, 20, 21 and 22 extending radially from a central portion 23, it being understood that the present invention is applicable to any multipole rotor and that the four pole rotor, shown in Figure 2, is merely for the purpose of description. The rotor excitation windings are formed in coils 26, 27, 28 and 29 placed coaxially about each of the poles. It will be noted that each space between two adjacent poles is occupied by approximately half of each of the coils associated with the adjacent poles.

The poles 19, 20, 21 and 22 extend longitudinally from one end of the rotor 14 to the other and project radially to its outer periphery, terminating at their outer ends in pole shoes 31, 32, 33 and 34, respectively. The pole shoes overhang the sides of the poles for purposes related to the flux distribution into and out of the poles. This overhang also serves to confine the coils 26, 27, 28 and 29 within the spaces between adjacent poles and within the outer periphery of rotor 15. Braces 36, 37, 38 and 39 overlie the coils holding them in place and resisting centrifugal force at high speed. Strips of insulating material 40 lie between the coils and the overlying braces. The construction heretofore described is conventional.

With this type of construction, the dissipation of the heat generated in coils 26, 27, 28 and 29 has been difficult because of the relatively large distances to the core from those portions of the coils that are located about midway between the poles and radially outward from the central portion 23. In order to provide paths for the flow of heat from these zones to the core, heat conducting ribs 41, 42, 43 and 44 project radially from the central portion 23 into the space between adjacent poles and in contact with the coils. The ribs are preferably located midway between adjacent poles and project between the two coils occupying each of these spaces. The ribs, extending longitudinally from one end of the rotor to the other are comprised of a material having a high coefficient of thermal conductivity reinforced by material of sufficient strength to support the ribs at high rotational speeds. For example, each rib may be made up of a die cast aluminum portion 46 supported and surrounded by a steel reinforcing portion 47.

Figure 3:
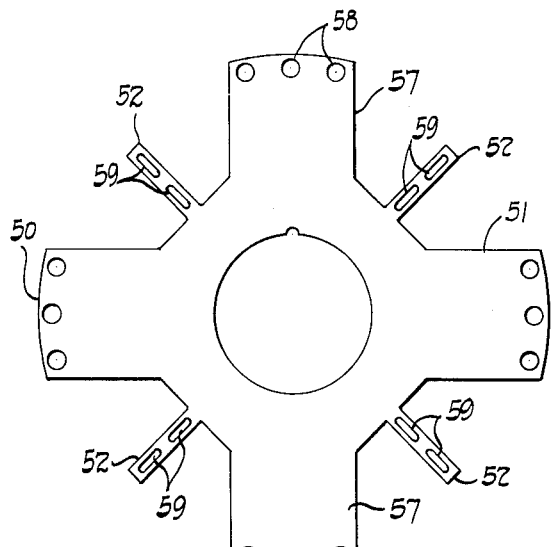
Figures 3 through 6 show the various punchings or laminations that comprise the preferred form of rotor.
Figure 5:
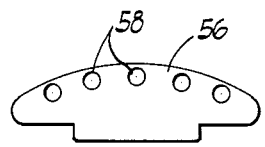
Figure 6:
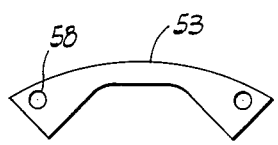
Figure 4:
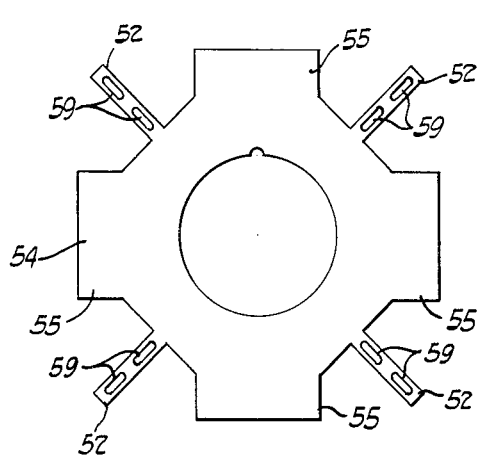

The laminated core structure 16 preferably is made up of a stack of punchings of various configurations as, for example, those in Figures 3 to 6. The laminated stack consists of layers of punchings alternately comprised of one punching 50 having full pole projections 51 and rib projections 52 as shown in Figure 3 together with four brace punchings 53 as shown in Figure 6 and one punching 54 having partial pole projections 55 and rib projections 52 shown in Figure 4 together with four pole shoe punchings 56 as shown in Figure 5. The punchings are stacked so that full pole projections 51 and the partial pole projections 55, as well as the rib projections 52, are axially aligned. The entire stack of punchings is held together by axially extending tie rods 57 passing through the various holes 58 located about the outer periphery of each of the various punchings extending thereto.

The configuration and arrangement of the punchings making up the rotor core structure 16 may vary from the foregoing illustrative example. For the purposes of this embodiment of the invention, it is necessary only that the laminations comprising the rotor core structure 16 contain rib projections extending radially from the central portion of the core structure and axially aligned so as to form the longitudinally extending and radially projecting ribs 41, 42, 43 and 44 between adjacent poles. The rib projections 52 are preferably formed integrally with the parent punchings. The rib projections preferably are apertured as at 59, Figures 3 and 4, so that when the stack of punchings is assembled with the rib projections 52 axially aligned, the apertures 59 form continuous longitudinally extending passages through each rib. Upon assembly of the stacked punchings into the rotor core structure 16, the passages formed by the aligned apertures 59 in the ribs are filled with a material having a high coefficient of thermal conductivity, such as aluminum. In forming the rib projections 52, we prefer to retain only so much of the metal of the parent punchings as is necessary to support the ribs at high rotational speeds. In this manner, the amount of heat conducting material contained in the heat conducting ribs is made as great as possible. The coils 26, 27, 28 and 29 are in intimate contact with the ribs 41, 42, 43 and 44 in the completed machine, and therefore, during the operation of a dynamoelectric machine embodying a rotor constructed in accordance with the present invention, a substantial percentage of the heat produced by the passage of current through the coils passes to the ribs. The ribs provide a metallic path of good heat conductivity for carrying heat to the central portion 23 of the rotor core structure 16. The core structure 16 can act as a heat sink, or the heat transmitted to the rotor core can be dissipated by a fluid cooling medium, such as oil, or air, passing through the hollow rotor shaft 15. The provision of a heat conducting rib lying between the two coils placed adjacent poles of the rotor thus provides a high heat conductivity path from approximately the center of each mass of heat producing windings resulting in heat flow from the center of each of the two coils between adjacent poles to the coil peripheries in all directions. In practice, we have found that in one machine, the temperature gradient across each of the coils is reduced to approximately one-half of the gradient found in coils in machines without the heat conducting ribs of the present invention.

Figure 7:
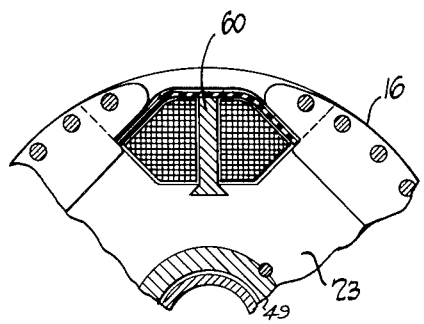
Figure 7 shows, in partial transverse cross section, a modified form of rotor.

A modified form of the invention is shown in Figure 7 in which the heat conducting rib 60 is comprised entirely of a material having a high coefficient of thermal conductivity, such as brass or aluminum. In this form, the heat conducting ribs 60 are rigidly connected to the central portion 23 of the rotor core structure 16 by suitable means, such as a dovetail joint. The solid ribs 60, longitudinally extending from one end of the rotor to the other, project radially into the space between adjacent poles and lie between the coils occupying that space in the same manner as the die cast ribs of the preferred form of the present invention. In operation, the solid ribs 60 conduct the heat from within the coils of heat producing windings to the rotor core structure 16 acting as a heat sink. The rotor core structure is preferably built up of laminations as before or may be solid, and the rotor may be mounted on a hollow shaft 49 through which the cooling medium can be passed.

Those skilled in the art will appreciate that various other changes and modifications can be made in the preferred form of apparatus described herein without departing from the spirit and scope of the invention.

We claim:

1. A rotor for a dynamoelectric machine comprising a rotor core having a substantially cylindrical central section, a plurality of poles disposed about and projecting radially from said central section, a plurality of longitudinally extending heat conducting ribs projecting radially from said central section and interposed between said poles, and excitation coils disposed coaxially about said poles and in heat conducting and close contact with said ribs, the oppositely facing longitudinal sides of said coils associated with said adjacent poles being separated from each other only by one of said ribs.

2. A rotor for a dynamoelectric machine comprising a rotor core having a substantially cylindrical central section a plurality of poles disposed about and projecting radially from said central section, a plurality of longitudinally extending ribs comprised substantially of a material having high thermal conductivity projecting radially from said central section and interposed midway between said poles, and an excitation coil disposed coaxially about each of said poles and in close overall contact with two of said ribs, each of said coils substantially filling the space between its associated pole and said ribs circumferentially adjacent thereto.

3. A rotor for a dynamoelectric machine comprising a rotor core mounted on a fluid cooled hollow shaft, said rotor core having a substantially cylindrical central section, a plurality of poles disposed about the outer periphery of said central section, said poles extending longitudinally along and projecting radially from said central section, a plurality of longitudinally extending heat conducting ribs projecting radially from said central section and interposed between said poles and adapted to conduct heat to said central section for dissipation by said fluid cooled hollow shaft, excitation coils disposed coaxially about said poles, and in heat conducting and close overall contact with said ribs.

4. A rotor for a dynamoelectric machine comprising a rotor core having a substantially cylindrical central section, a plurality of poles disposed about and projecting radially from said central section, a plurality of longitudinally extending steel reinforced aluminum die cast ribs projecting radially from said central section and interposed between said poles, and excitation coils disposed coaxially about said poles and in heat conducting and close overall contact with said ribs, the oppositely facing longitudinal sides of said coils associated with said adjacent poles being parallel and separated from each other only by one of said ribs.

5. A rotor for a dynamoelectric machine comprising a transversely laminated rotor core having a substantially cylindrical central section, a plurality of poles disposed about the outer periphery of said central section, said poles extending longitudinally along and projecting radially from said central section, a plurality of longitudinally extending die cast aluminum ribs having transversely laminated radially extending steel reinforcing means, said ribs projecting radially from said central section and interposed midway between said poles, an excitation coil disposed coaxially about each of said poles, and in heat conducting and close contact with two of said ribs.

6. A rotor for a dynamoelectric machine comprising a transversely laminated rotor core mounted on a fluid cooled hollow shaft, said core having a substantially cylindrical central section, pairs of diametrically opposed longitudinally extending and radially projecting poles disposed about said central section, a plurality of longitudinally extending die cast heat conducting ribs having transversely laminated radially extending reinforcing means, said ribs projecting radially from said central section and interposed said pole arms and adapted to conduct heat to said central section for dissipation by said fluid cool hollow shaft, and excitation coils disposed about said pole arms and in heat conducting and close contact with said ribs.

7. A rotor core for a dynamoelectric machine composed of a stack of transverse plane laminations, each of said laminations having a substantially circular central portion, pairs of diametrically opposed pole projections disposed about and extending radially from said central portion, and apertured rib projections extending radially from said central portion and interposed said pole projections, said pole projections and said rib projections of said lamination being axially aligned forming longitudinally extending poles and ribs, said apertures in said axially aligned projections forming axially extending passages through said ribs, and material of high thermal conductivity disposed in each of said passages.

8. A rotor for a dynamoelectric machine comprising a rotor core, excitation coils disposed about and carried by said core, and a plurality of heat conducting ribs projecting radially from said core and in heat conducting and close contact with said coils, said ribs providing the only separation between the longitudinal sides of said coils.

9. A rotor for a dynamoelectric machine comprising a rotor core mounted on a fluid cooled hollow shaft, excitation coils disposed about and carried by said core, and a plurality of heat conducting ribs projecting radially from said core and in heat conducting and close overall contact with said coils, said ribs being adapted to conduct heat from said coils to said core for dissipation by said fluid cooled hollow shaft.

References Cited in the file of this patent

UNITED STATES PATENTS

| | | |
|---|---|---|
| 249,148 | Long | Nov. 1, 1881 |
| 2,654,037 | Henter | Sept. 29, 1953 |
| 2,691,113 | Ordas | Oct. 5, 1954 |

FOREIGN PATENTS

| | | |
|---|---|---|
| 60,125 | Sweden | Jan. 19, 1926 |
| 155,539 | Germany | Mar. 4, 1904 |